(12) United States Patent
Shiue

(10) Patent No.: US 11,535,010 B2
(45) Date of Patent: Dec. 27, 2022

(54) WETSUIT GARMENT FABRICATED AS REINFORCEDLY JOINED BY SUBSTANTIALLY ELASTIC JOINING MEMBER

(71) Applicant: Min-Chen Shiue, Wejie (TW)

(72) Inventor: Min-Chen Shiue, Wejie (TW)

(73) Assignee: SHEICO GROUP (SHEI CHUNG HSIN INDUSTRIAL) CO., LTD., Wujei (TW)

( * ) Notice: Subject to any disclaimer, the term of this patent is extended or adjusted under 35 U.S.C. 154(b) by 1049 days.

(21) Appl. No.: 16/219,881

(22) Filed: Dec. 13, 2018

(65) Prior Publication Data

US 2020/0189243 A1 Jun. 18, 2020

(51) Int. Cl.
*B32B 25/10* (2006.01)
*B32B 5/02* (2006.01)
(Continued)

(52) U.S. Cl.
CPC .............. *B32B 25/10* (2013.01); *B32B 3/16* (2013.01); *B32B 5/026* (2013.01); *B32B 5/18* (2013.01);
(Continued)

(58) Field of Classification Search
CPC ........ B32B 2037/1215; B32B 2250/03; B32B 2250/40; B32B 2262/0215; B32B 2262/0261; B32B 2262/0276; B32B 2266/0207; B32B 2305/18; B32B 2307/51; B32B 2309/02; B32B 2310/0454; B32B 2319/00; B32B 2437/00; B32B 25/10; B32B 25/14; B32B 3/16; B32B 37/0076; B32B 37/10; B32B 37/12; B32B 37/16; B32B 5/024; B32B 5/026; B32B 5/18; B32B 5/245; B32B 7/05; B32B 7/12; B63C 11/04; B63C 2011/046; B29C 65/02; B29C 65/10; B29C 65/18; B29C 65/40; B29C 65/48; B29C 65/4815; B29C 65/50; B29C 65/5042; B29C 66/43; B29C 66/435; B29C 66/1142
USPC ......... 156/60, 242, 250, 269, 271, 297, 299, 156/304.1, 304.3, 305, 308.2, 309.6, 156/309.9, 320; 441/88, 102, 103, 104, 441/105, 106, 107, 120; 2/2.15
See application file for complete search history.

(56) References Cited

U.S. PATENT DOCUMENTS 3,294,617 A * 12/1966 Way ................ B29C 66/836
156/244.11
4,388,134 A * 6/1983 Long ................ B29C 66/0016
156/304.6
(Continued)

FOREIGN PATENT DOCUMENTS

DE 3312464 A1 * 10/1984
GB 1604641 A * 12/1981 ........... A41D 27/245

*Primary Examiner* — Philip C Tucker
*Assistant Examiner* — Brian R Slawski

(57) ABSTRACT

A method for fabricating wetsuit garment including wetsuits, boots and gloves for water sports uses, comprising preparation of at least a substantially elastic joining member made of hot melt adhesive, and joining at least two interconnected panels of rubber foam or sponge by the substantially elastic joining member to cover and seal the seam between the two interconnected panels for firmly bonding the two interconnected panels for making a strong, elastic and flexible wetsuit garment.

8 Claims, 5 Drawing Sheets

(51) Int. Cl.
      *B32B 25/14*    (2006.01)
      *B32B 5/18*     (2006.01)
      *B63C 11/04*    (2006.01)
      *B32B 5/24*     (2006.01)
      *B32B 3/16*     (2006.01)
      *B32B 7/05*     (2019.01)
      *B32B 7/12*     (2006.01)
      *B32B 37/10*    (2006.01)
      *B32B 37/16*    (2006.01)
      *B32B 37/12*    (2006.01)
      *B32B 37/00*    (2006.01)
      *B29C 65/00*    (2006.01)
      *B29C 65/10*    (2006.01)
      *B29C 65/48*    (2006.01)
      *B29C 65/18*    (2006.01)
      *B29C 65/50*    (2006.01)
      *B29C 65/40*    (2006.01)

(52) U.S. Cl.
      CPC ............... *B32B 5/245* (2013.01); *B32B 7/05* (2019.01); *B32B 7/12* (2013.01); *B32B 25/14* (2013.01); *B32B 37/0076* (2013.01); *B32B 37/10* (2013.01); *B32B 37/12* (2013.01); *B32B 37/16* (2013.01); *B63C 11/04* (2013.01); *B29C 65/10* (2013.01); *B29C 65/18* (2013.01); *B29C 65/40* (2013.01); *B29C 65/4815* (2013.01); *B29C 65/5042* (2013.01); *B29C 66/1142* (2013.01); *B29C 66/43* (2013.01); *B32B 2037/1215* (2013.01); *B32B 2266/0207* (2013.01); *B32B 2305/18* (2013.01); *B32B 2307/51* (2013.01); *B32B 2309/02* (2013.01); *B32B 2310/0454* (2013.01); *B32B 2319/00* (2013.01); *B32B 2437/00* (2013.01); *B63C 2011/046* (2013.01)

(56) References Cited

U.S. PATENT DOCUMENTS

| | | | | |
|---|---|---|---|---|
| 4,416,027 A | * | 11/1983 | Perla | B29C 65/72 428/57 |
| 2001/0008027 A1 | * | 7/2001 | Duplock | B32B 27/12 2/69 |
| 2010/0210164 A1 | * | 8/2010 | Shih | B32B 7/05 442/381 |
| 2011/0265233 A1 | * | 11/2011 | Shiue | A43B 5/08 2/243.1 |
| 2017/0202277 A1 | * | 7/2017 | Oku | A41D 27/245 |

* cited by examiner

WETSUIT GARMENT FABRICATED AS REINFORCEDLY JOINED BY SUBSTANTIALLY ELASTIC JOINING MEMBER

BACKGROUND OF THE INVENTION

U.S. Pat. No. 8,359,612 disclosed a method of fabricating water sports garment, comprising: preparing a liquid sealant solution having viscosity of 200,000~500,000 cps, wherein the formulation of the liquid sealant solution comprises: 100 parts by weight of a synthetic elastomer, 5~9 parts by weight of a vulcanizing agent; 2.6~3.2 parts by weight of an antioxidant package and solvents; coating the liquid sealant solution onto a stitchless seam between two waterproof sheets to form a waterproof strip; and vulcanizing the waterproof strip.

However, such a prior art has the following drawbacks:
1. The adhered product as vulcanized in the oven takes time and will increase the production complexity and cost.
2. The butt-spliced ends of the two interconnected panels of rubber sponge should be carefully coated with the liquid adhesive on the seam of the two panels, thereby increasing, production time and cost
3. The liquid adhesive may be spread sidewardly from the seam of the two panels to cause uneven or unflattened surface on the coating or joining area, thereby affecting a smooth appearance and decreasing commercial value of the product.

The present inventor has found the drawbacks of the conventional water sports garment, and invented the present wetsuit garment fabricated as joined by high-elasticity joining member.

SUMMARY OF THE INVENTION

The object of the present invention is to provide a method for fabricating wetsuit garment including wetsuits, boots and gloves for water sports uses, comprising preparation of at least a substantially elastic joining member made of hot melt adhesive, and joining at least two interconnected panels of rubber foam or sponge by the high-elasticity joining member to cover and seal the seam between the two interconnected panels for firmly bonding the two interconnected panels for making the wetsuit garment.

Another object of the present invention is to provide a wetsuit garment as fabricated by the method by joining at least two interconnected panels of rubber foam with a high-elasticity joining member made of hot melt adhesive.

DETAILED DESCRIPTION

Referring to the accompanying drawings, a method for fabricating the wetsuit garment of the present invention comprises the following steps:

1. Preparation of substantially elastic joining member 1.

Figure 1:
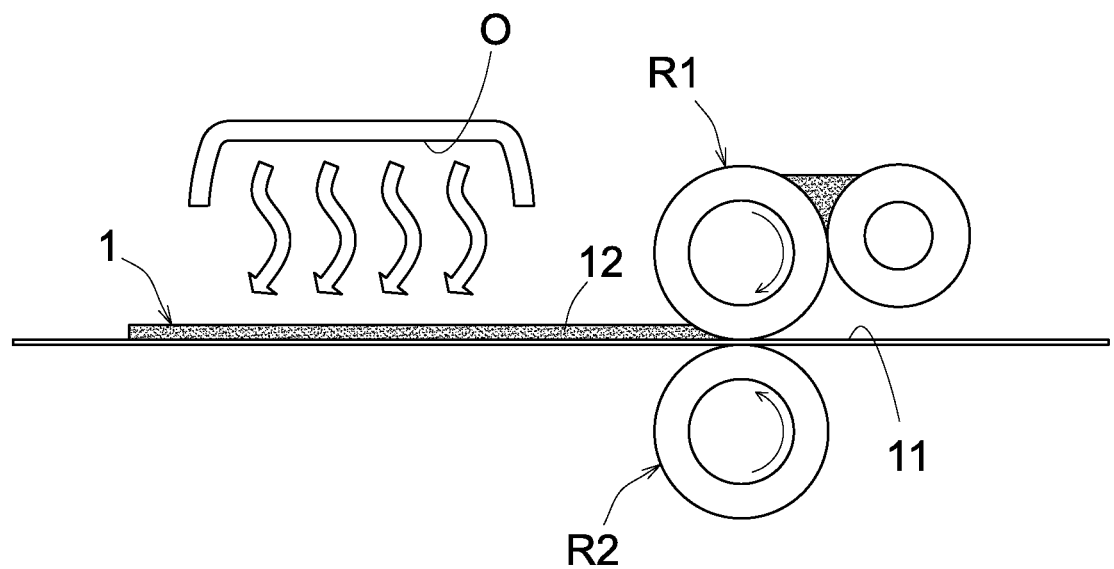
FIG. 1 shows a flow sheet for making the substantially elastic joining

A substantially elastic composite film 11 as shown in FIG. 1 is laminated thereon with a hot melt adhesive 12 by an upper coating roller set R1 and a lower guide roller R2 to thermally Coat the hot melt adhesive 12 on the substantially elastic composite film 11 at a heating temperature of 80~150° C. in an electric oven O to form a substantially elastic composite laminate shat.

Figure 2:
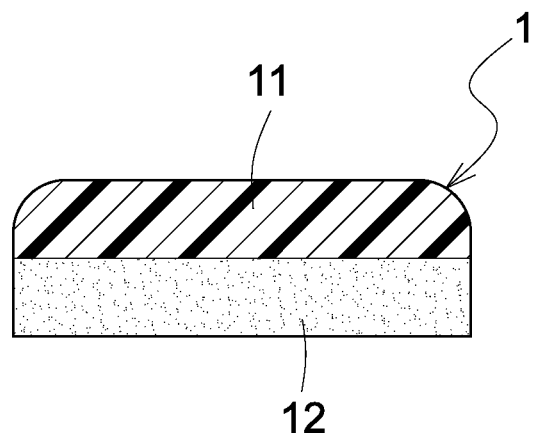
FIG. 2 shows a sectional drawing of the joining member of the present invention.

The substantially elastic composite laminate sheet is then cooled and cut into strips, each strip having a width of 1~25 mm and a thickness of 0.3~1 mm as shown in a sectional drawing of FIG. 2. Such a strip is the so-called substantially elastic joining member 1.

Figure 4:
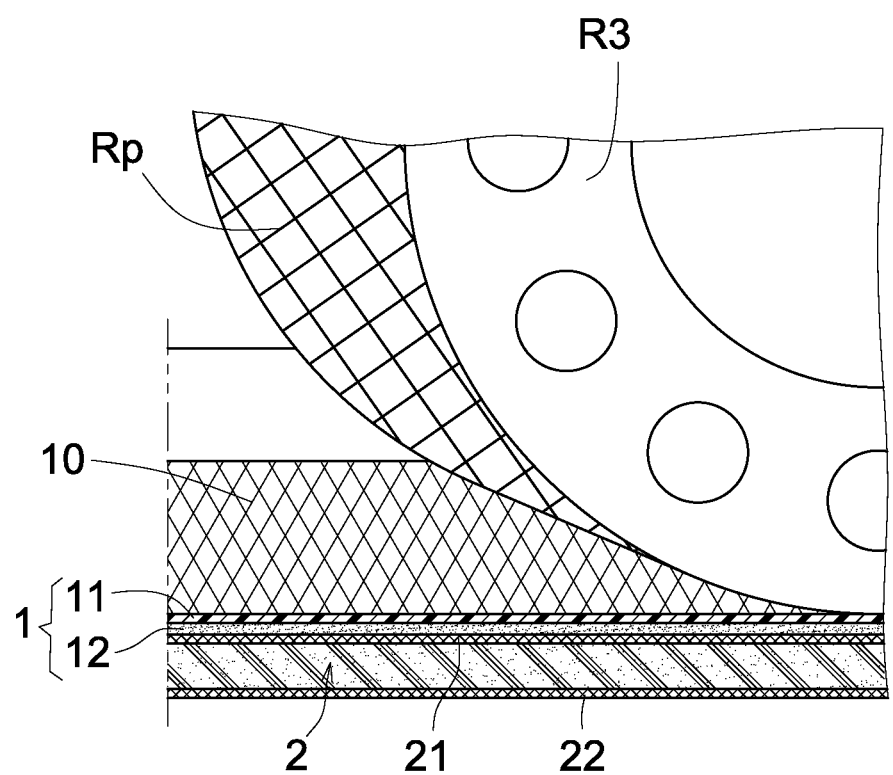
FIG. 4 shows the joining member being embossed in accordance with the present invention.

The substantially elastic composite film 11 may be made of thermoplastic film or other polymer films of high elasticity. As shown in FIG. 4, an embossing pattern, Rp circumferentially formed on a press roller R3 may be provided for embossing pattern 10 on the joining member 1.

The joining member 1 may also be ink printed for printing decoration pattern on the joining member 1.

The joining member 1 is a solid, when not be heated, for easy handling.

2. Fabrication of Wetsuit Garment:

Two panels 2 of rubber foam including Neoprene foam to be interconnected or joined are arranged in a juxtapositional relationship, or butt spliced, or end-to-end arrangement; a primary adhesive with a liquid adhesive or sealant 20, such as TPU-based adhesive, is glued on opposite ends of the two panels 2, 2 to be interconnected to seal a seam 3 between the two panels to be interconected; and a substantially elastic joining member 1 is provided to cover the seam S between the two panels 2, 2 to be interconnected.

Figure 3:
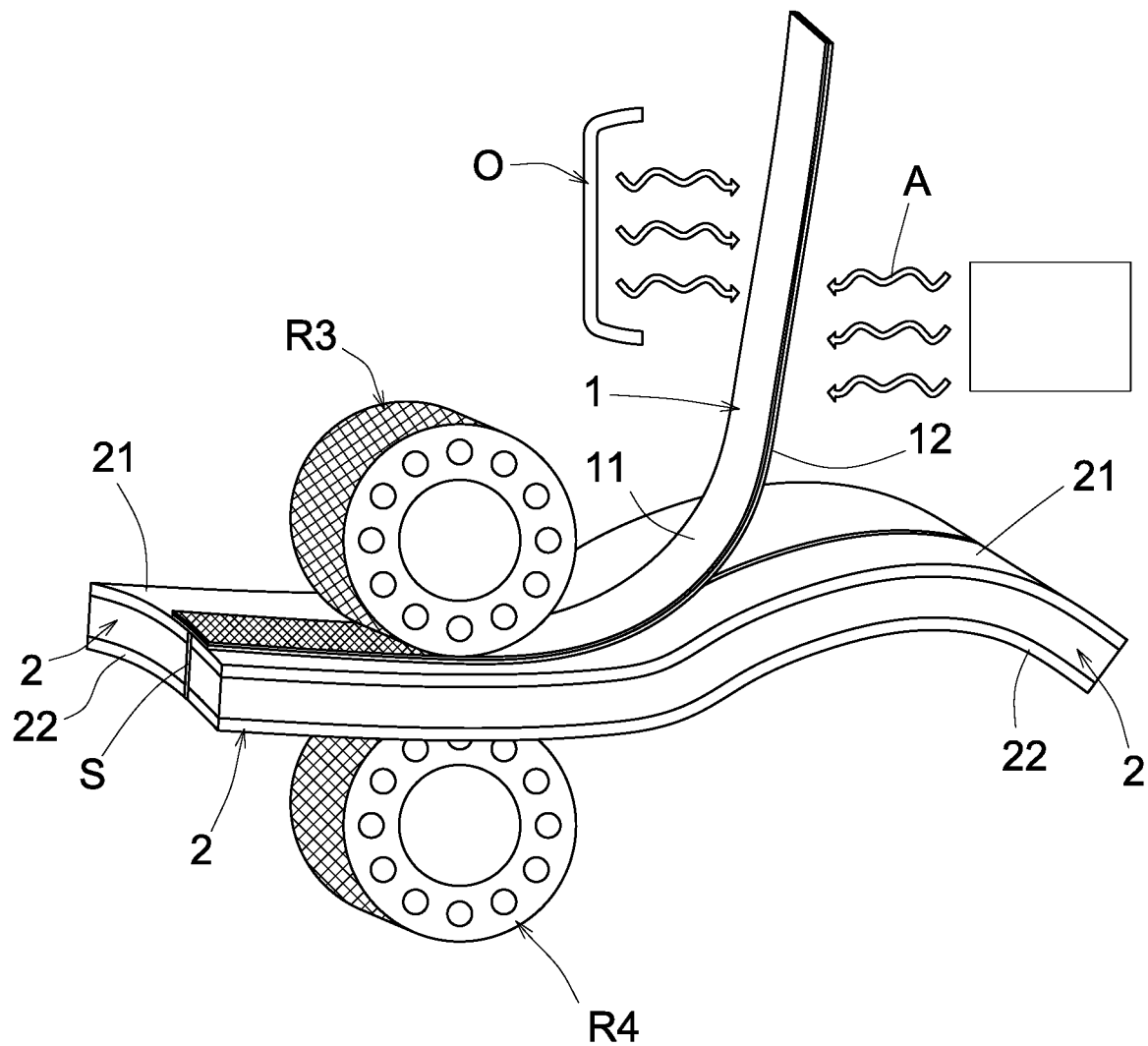
FIG. 3 shows a flow sheet for covering and sealing a seam between two interconnected panels of rubber foam in accordance with the present invention.

The two panels 2, 2 as covered by the joining member 1 are then together fed in between an upper press roller R3 and a lower press roller R4 as shown in FIG. 3.

A hot air stream A of 300~500° C. is forcedly blown to melt the hot melt adhesive 12 in the joining member 1 and an electric heating is applied onto the composite film 11 at a temperature up to 150° C. The two press rollers R3, R4 are rotatably rolling on the two panels 2 and the joining member 1 between the two rollers R3. R4 to pressurize melted hot melt adhesive 12 to adhere the joining member 1 with the two panels 2, 2 and also to downwardly penetrate the adhesive 12 into the seam S between the two panels 2, 2 as pressed by the two rollers R3, R4 from FIG. 3.

Figure 5:
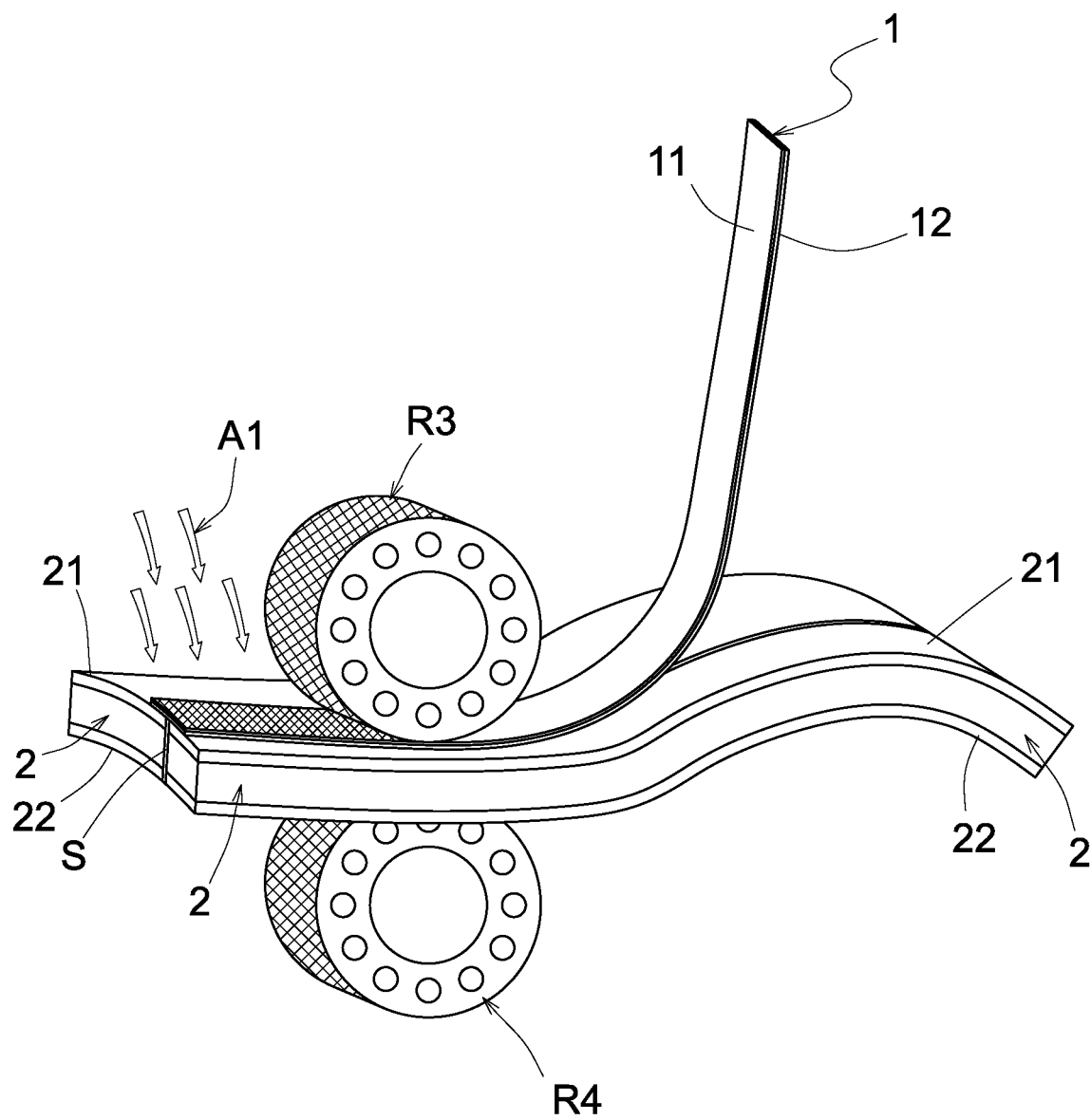
FIG. 5 shows a flow sheet for making the wetsuit garment of the present invention, after cooling following FIG. 3.

The hot melt adhesive 12 is interlocked and firmly adhered with the primary adhesive 20 as glued on opposite ends of the two panels 2, 2 for a strong adhesion of the hot melt adhesive 12 with the primary adhesive 20. Then, air A1 at a room temperature ranging from 20° C.~28° C. as shown in FIG. 5 is applied to cool and consolidate the interconnected panels 2, 2 and the joining member 1 for firmly bonding the two interconnected panels 2, 2. After cooling, a wetsuit garment will be produced in accordance with the present invention.

As shown in FIG. 3, each panel 2 of rubber foam is sandwiched in between an upper fabric layer 21 and a lower fabric layer 22.

Such a fabric layer 21 or 22 may be made of elastic fabric, including: Spandex knitted or woven with polyester, or polyamide, etc.

The above-mentioned heating device may also be substituted with other heating devices, such as UV 1 mps or other electric heaters, not limited in the present invention.

Even the panel 2 has been laminated with fabric layers 21, 22 as shown in FIG. 3, the hot melt adhesive 12 of the joining member 1 may well bond the two interconnected panels 2, 2 and seal the seam 3 between the two interconnected panels 2, 2 to form a wetsuit product having high elasticity, high strength and high flexibility.

The joining member 1 may also be provided to connect the two panels of rubber foam without being laminated with fabric layers 21, 22 as aforementioned.

Figure 6:
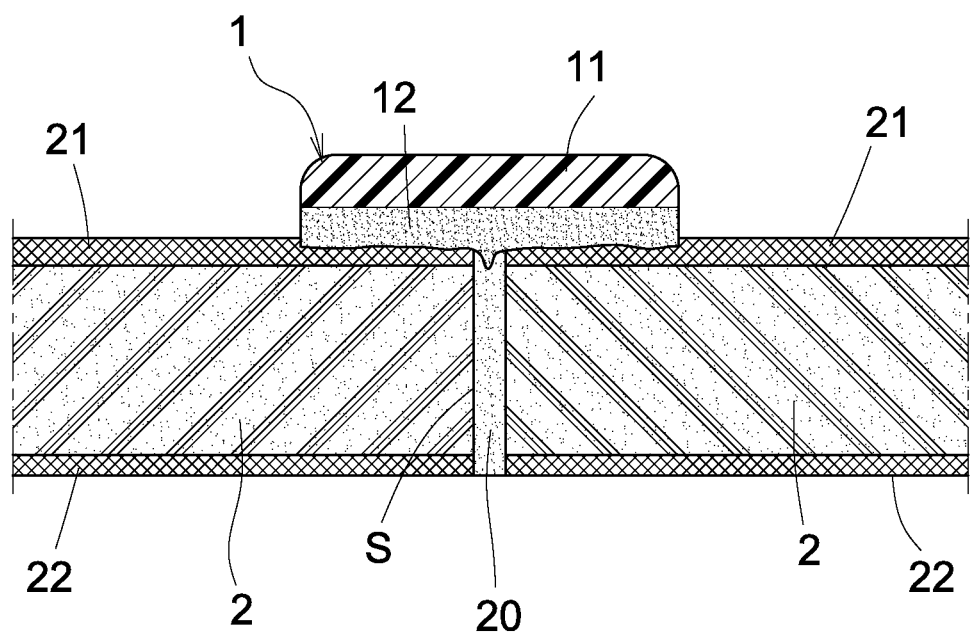
FIG. 6 is a sectional illustration showing the wetsuit garment having its seam joined by the joining member of the present invention.

During the thermal pressing of the two interconnected panels 2 as joined by the joining member 1, an adhering, and bonding mechanism as effected by the joining member 1 is especially stressed as follows with reference to FIG. 6.

When heated by the electric heating and hot air A (FIG. 3), the hot melt adhesive 12 in the high-elasticity joining member 1 is melted to first adhere the joining member 1 with each upper portion of the two neighboring or juxtaposed panels 2, 2 to primarily join the two panels 2, 2.

Then, the melted adhesive 12 will partially flow downwardly to penetrate, especially under pressing pressure by the rollers R3, R4, to be interlocked and adhered with the primary adhesive 20 as early sealed in the seam S between the two panels 2, 2 to further join the two panels 2, 2 disposed on opposite sides (or ends) of the seam S. After cooling, the adhesive 12 will adhere and bond the two panels 2, 2 firmly.

Conclusively, the present invention is superior to the prior art with the following, advantages:

1. After joining the two interconnected panels by hot melt adhesive of the joining member the interconnected panels of this application is instantly cooled and consolidated, without time-consuming and cost-increased vulcanization as required by the prior art, thereby being much improved over the prior art.
2. The appearance of the wetsuit product as obtained by the present invention is more homogeneous, or uniform than the prior art.
3. The present invention provides a we suit garment more stretchable, or flexible than the prior art. For example, when conducting a stretching test of a specimen of the present invention having high-elasticity joining member to be compared with another specimen of the prior art. Namely, the specimen of the present invention is elongated for 180% and then repeatedly stretched. The specimen of the present invention is broken until a 20,000-time stretching. Comparatively, a specimen of the prior art, after being elongated for 180%. is subjected to repeated stretching and then broken only after 10,000-time stretching. So, the present invention is more elastic with higher strength than the prior art.

The present invention may be modified without departing from the spirit and scope of the present invention.

I claim:

1. A method for fabricating a wetsuit garment comprising the steps of:
   A. preparation of at least one substantially elastic joining member by laminating a substantially elastic composite film with a hot melt adhesive; and
   B. arranging at least two interconnected panels of rubber foam in a juxtapositional relationship and gluing a primary adhesive including a liquid sealant on opposite ends of said at least two interconnected panels, and placing said at least one substantially elastic joining member containing said hot melt adhesive therein on at least one seam between said at least two interconnected panels of rubber foam, whereby upon thermal pressing of said at least two interconnected panels with said at least one substantially elastic joining member, the hot melt adhesive is melted to adhere said hot melt adhesive with said at least two interconnected panels and also adhere said primary adhesive in said at least one seam, and then, upon cooling of said at least two interconnected panels and said at least one substantially elastic joining member, the hot melt adhesive is cooled and consolidated for firmly bonding said at least two interconnected panels of rubber foam and said at least one substantially elastic joining member for forming said wetsuit garment.

2. The method according to claim 1, wherein said substantially elastic composite film and said hot melt adhesive are fed in between an upper press roller and a lower press roller to be thermally pressed at a temperature of 80~150° C. to form a substantially elastic composite laminate sheet, which is then cooled and cut into a plurality of said at least one substantially elastic joining members.

3. The method according to claim 1, wherein hot air of 300~500° C. is forcedly blown to said at least one substantially elastic joining member to melt said hot melt adhesive in said at least one substantially elastic joining member in step A; and wherein said at least two interconnected panels of rubber foam, being juxtaposed and having said at least one seam between said at least two interconnected panels being covered with said at least one substantially elastic joining member, are fed in between two press rollers to be thermally pressed under heating at a temperature up to 150° C. in step B; and then, upon applying air to said at least two interconnected panels and said at least one substantially elastic joining member, said at least two panels and said at least one substantially elastic joining member will be cooled and consolidated to form said wetsuit garment.

4. The method according to claim 1, wherein said rubber foam is sandwiched in between an upper fabric layer and a lower fabric layer.

5. A wetsuit garment fabricated by a method comprising the steps of:
   A. preparation of at least one substantially elastic joining member by laminating a high-elasticity composite film with a hot melt adhesive; and
   B. arranging at least two interconnected panels of rubber foam in a juxtapositional relationship and gluing a primary adhesive including a liquid sealant on opposite ends of said at least two interconnected panels, and placing said at least one substantially elastic joining member containing said hot melt adhesive therein on at least one seam between said at least two interconnected panels of rubber foam, whereby upon thermal pressing of said at least two interconnected panels with said at least one substantially elastic joining member, the hot melt adhesive is melted to adhere said hot melt adhesive with said at least two interconnected panels and also adhere said primary adhesive in said at least one seam, and then, upon cooling of said at least two interconnected panels and said at least one substantially elastic joining member, the hot melt adhesive is cooled and consolidated for firmly bonding said at least two interconnected panels of rubber foam and said at least one substantially elastic joining member for forming said wetsuit garment.

6. The wetsuit garment according to claim 5, wherein said high-elasticity composite film and said hot melt adhesive are fed in between an upper press roller and a lower press roller to be thermally pressed at a temperature of 80~150° C. to form a substantially elastic composite laminate sheet, which is then cooled and cut into a plurality of said at least one substantially elastic joining members.

7. The wetsuit garment according to claim 5, wherein hot air of 300~500° C. is forcedly blown to said at least one substantially elastic joining member to melt said hot melt adhesive in said at least one substantially elastic joining member; and wherein said at least two interconnected panels of rubber foam, being juxtaposed and having said at least one seam between said at least two interconnected panels being covered with said at least one substantially elastic joining member, are fed in between two press rollers to be thermally pressed under heating at a temperature up to 150° C.; and then, upon applying air to said at least two interconnected panels and said at least one substantially elastic joining member, said at least two interconnected panels and said joining member are cooled and consolidated to form said wetsuit garment.

8. The wetsuit garment according to claim 5, wherein said rubber foam is sandwiched in between an upper fabric layer and a lower fabric layer.

\* \* \* \* \*